Patented Apr. 27, 1926.

1,582,029

UNITED STATES PATENT OFFICE.

GUILLAUME DE MONTMOLLIN AND GÉRALD BONHÔTE, OF BASEL, SWITZERLAND, ASSIGNORS TO THE SOCIETY OF CHEMICAL INDUSTRY IN BASLE, OF BASEL, SWITZERLAND.

AZODYESTUFFS AND PROCESS OF MAKING SAME.

No Drawing.    Application filed March 23, 1925.    Serial No. 17,834.

*To all whom it may concern:*

Be it known that we, GUILLAUME DE MONTMOLLIN and GÉRALD BONHÔTE, both citizens of Switzerland, residing at Basel, Switzerland, have invented new and useful Azodyestuffs and Process of Making Same, of which the following is a full, clear, and exact specification.

The invention relates to the manufacture of valuable new azodyestuffs which may be produced on the fibre. It comprises the new dyestuffs, the manufacture of same and the material on which the new dyestuffs have been developed.

It has been found that bordeaux to blue and black azodyestuffs with excellent fastness may be obtained by coupling 4-hydroxy-naphthalene-1-arylketone with tetrazo-compounds of the general formula:

$$HO-N=N-R_1-N=N-R_2-N=N-OH$$

wherein $R_1$ and $R_2$ stand for equal or different aromatic residues.

The dyestuffs thus obtained, correspond with the general formula

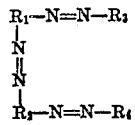

in which $R_1$ and $R_2$ stand for the residues already mentioned and $R_3$ and $R_4$ mean 4-hydroxynaphthyl-1-arylketone residues, form dark powders insoluble in water, dissolving in acetic acid and alcohol from red to brown and blue, in concentrated sulfuric acid to green solutions, which dyestuffs may be employed for the production of lakes; prepared on the fibre they yield bright bordeaux to blue and black shades.

*Example 1.*

106 parts of 4.4'-diaminoazobenzene are tetrazotized as usual and introduced into a solution containing 248 parts of 4-hydroxy-caustic soda, 100 parts of carbonate of naphthalene-1-phenylketone, 40 parts of sodium and 200 parts of water. The dyestuff thus obtained separates immediately as black residue which is filtered and dried.

The new dyestuff corresponds most probably with the following formula:

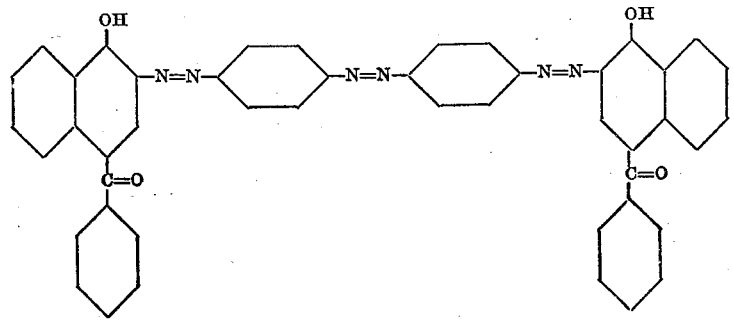

Example 2.

Cotton is impregnated with an alkaline solution containing 15 gr. of 4-hydroxy-naphthalene-1-phenylketone per liter and passes through a bath of tetrazotized 4.4'-diamino-3'-methoxy-6'-methylazobenzene neutralized with sodium acetate. The cotton is thus dyed full, fast reddish marine-blue tints.

Example 3.

The material to be printed is padded with an alkaline solution containing 15 gr. of 4-hydroxynaphthalene-1-phenylketone per liter. After drying the material is printed with a printing color containing 13.1 parts of the reduced tetrazotized azodyestuff from diazotized m-nitraniline and α-naphthylamine per liter. The dark violet dyeing develops rapidly and is very fast.

The new dyestuff corresponds most probably with the following formula:

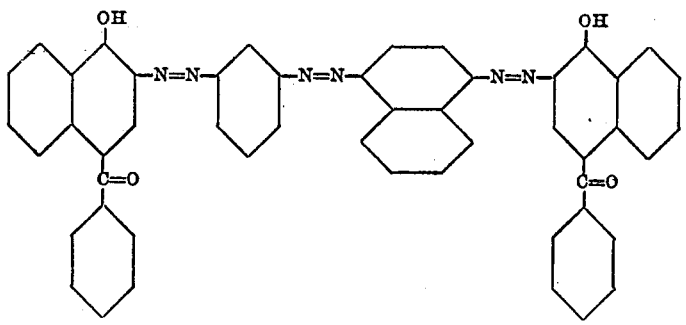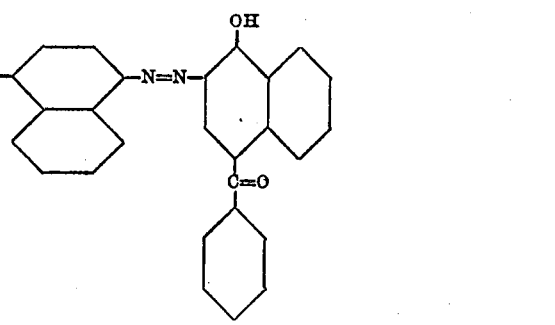

In the following table the shades of some of the dyestuffs which may be produced on cotton according to the present invention are given.

| Diazotization component. | Coupling component. | Shade |
|---|---|---|
| p-nitraniline+α-naphthylamine, reduced. | 4-hydroxynaphthalene-1-phenylketone. | Dark bluish-violet. |
| p-nitraniline+o-anisidine, reduced. | ----do---- | Dark violet. |
| p-nitro-o-chloroaniline +p-cresidine, reduced. | ----do---- | Violet. |
| p-nitro-o-anisidine+aniline, reduced. | ----do---- | Do. |
| p-nitro-o-anisidine+cresidine, reduced. | ----do---- | Reddish dark blue. |
| m-nitranilin+cresidine, reduced. | ----do---- | Bluish-violet. |
| p-aminoacetanilide+cresidine, saponified. | ----do---- | Reddish marine-blue. |
| Do. | 4-hydroxynaphthalene-1-(2-chloro)-phenylketone. | Marine-blue. |
| Do. | 4.4'-dihydroxy-1.1'-dinaphthylketone. | Black. |
| p-nitraniline+aniline, reduced. | 4-hydroxynaphthalene-1-phenylketone. | Dark bordeaux. |
| p-nitraniline+α-naphthylamine, reduced. | ----do---- | Dark violet. |

What we claim is:

1. As new products the herein described new azodyestuffs of the general formula.

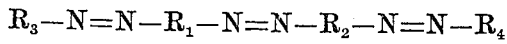

wherein $R_1$ and $R_2$ stand for arylresidues and $R_3$ and $R_4$ for a 4-hydroxynaphthalene-1-arylketone residues, which dyestuffs form dark powders insoluble in water, dissolving in acetic acid and alcohol from red to brown and blue, in concentrated sulfuric acid to green solutions, which dyestuffs may be employed for the production of lakes; prepared on the fibre they yield bright bordeaux to blue and black shades.

2. As new products the herein described new azodyestuffs of the general formula

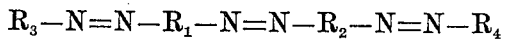

wherein $R_1$ and $R_2$ stands for arylresidues and $R_3$ and $R_4$ for a 4-hydroxynaphthalene-1-phenylketone, which dyestuffs form dark powders insoluble in water, dissolving in acetic acid and alcohol from red to brown and blue, in concentrated sulfuric acid to green solutions, which dyestuffs may be employed for the production of lakes; prepared on the fibre they yield bright bordeaux to blue and black shades.

3. As new products the herein described new azodyestuffs of the general formula.

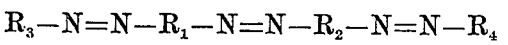

wherein $R_1$ and $R_2$ stand for aryl-residues and $R_3$ and $R_4$ for the 4-hydroxynaphthalene-1-phenylketone, which dyestuffs form dark powders insoluble in water, dissolving in acetic acid and alcohol from red to brown and blue, in concentrated sulfuric acid to green solutions, which dyestuffs may be employed for the production of lakes; prepared on the fibre they yield bright bordeaux to blue and black shades.

4. As new products the herein described new azodyestuffs of the general formula

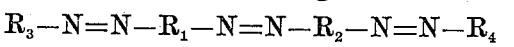

wherein $R_1$ and $R_2$ stand for aryl residues of the benzene series, and $R_3$ and $R_4$ for the 4-hydroxynaphthalene-1-phenylketone, which dyestuffs form dark powders insoluble in water, dissolving in acetic acid and alcohol from red to brown and blue, in concentrated sulfuric acid to green solutions, which dyestuffs may be employed for the production of lakes; prepared on the fibre they yield bright bordeaux to blue and black shades.

5. The material dyed with the dyestuffs of claim 1, said dyestuffs being developed on the material.

6. The material dyed with the dyestuffs of claim 2, said dyestuffs being developed on the material.

7. The material dyed with the dyestuffs of claim 3, said dyestuffs being developed on the material.

8. The material dyed with the dyestuffs of claim 4, said dyestuffs being developed on the material.

In witness whereof we have hereunto signed our names this 11th day of March, 1925.

GUILLAUME DE MONTMOLLIN.
GÉRALD BONHÔTE.